United States Patent
Wang et al.

(10) Patent No.: US 8,996,847 B2
(45) Date of Patent: Mar. 31, 2015

(54) GLOBAL REGISTER PROTECTION IN A MULTI-THREADED PROCESSOR

(71) Applicant: Imagination Technologies Limited, Kings Langley (GB)

(72) Inventors: Guixin Wang, Dongguan (CN); Hugh Jackson, St. Albans (GB); Robert Graham Isherwood, Buckingham (GB)

(73) Assignee: Imagination Technologies Limited, Kings Langley (GB)

(*) Notice: Subject to any disclaimer, the term of this patent is extended or adjusted under 35 U.S.C. 154(b) by 267 days.

(21) Appl. No.: 13/780,115

(22) Filed: Feb. 28, 2013

(65) Prior Publication Data

US 2014/0068232 A1 Mar. 6, 2014

(30) Foreign Application Priority Data

Aug. 30, 2012 (GB) .................................. 1215428.2

(51) Int. Cl.
*G06F 9/30* (2006.01)
*G06F 9/38* (2006.01)
*G06F 9/46* (2006.01)

(52) U.S. Cl.
CPC .......... *G06F 9/30098* (2013.01); *G06F 9/3851* (2013.01); *G06F 9/468* (2013.01)
USPC ....................................................... 712/214

(58) Field of Classification Search
CPC combination set(s) only.
See application file for complete search history.

(56) References Cited

U.S. PATENT DOCUMENTS

| | | | | |
|---|---|---|---|---|
| 4,891,753 A | * | 1/1990 | Budde et al. | 712/217 |
| 5,185,872 A | * | 2/1993 | Arnold et al. | 712/217 |
| 5,884,061 A | * | 3/1999 | Hesson et al. | 712/217 |
| 7,757,070 B1 | * | 7/2010 | Kang et al. | 712/228 |
| 7,890,735 B2 | * | 2/2011 | Tran | 712/215 |
| 2004/0073906 A1 | | 4/2004 | Chamdani et al. | |
| 2007/0294702 A1 | | 12/2007 | Melvin et al. | |
| 2009/0144519 A1 | | 6/2009 | Codrescu et al. | |

OTHER PUBLICATIONS

Krishnan,V. etal., A Chip-Multiprocessor Architecture with Speculative Multithreading,1999, IEEE, IEEE transactions on Computers vol. 48, No. 9, pp. 866-880.*
Zilles, C.B. etal., The Use of Multithreading for Exception Handling, 1999, IEEE, pp. 219-229.*

(Continued)

*Primary Examiner* — Eric Coleman
(74) *Attorney, Agent, or Firm* — Vorys, Sater, Seymour and Pease LLP; Vincent M DeLuca

(57) ABSTRACT

Global register protection in a multi-threaded processor is described. In an embodiment, global resources within a multi-threaded processor are protected by performing checks, before allowing a thread to write to a global resource, to determine whether the thread has write access to the particular global resource. The check involves accessing one or more local control registers or a global control field within the multi-threaded processor and in an example, a local register associated with each other thread in the multi-threaded processor is accessed and checked to see whether it contains an identifier for the particular global resource. Only if none of the accessed local resources contain such an identifier, is the instruction issued and the thread allowed to write to the global resource. Otherwise, the instruction is blocked and an exception may be raised to alert the program that issued the instruction that the write failed.

18 Claims, 5 Drawing Sheets

(56) References Cited

OTHER PUBLICATIONS

Farkas, K.I., etal., The Multicluster Architecture: Reducing Cycle Time Through Partitioning, 1997, IEEE, pp. 149-159.*

Search and Examination Report in GB1215428.2 (Dec. 19, 2012).

Infineon Technologies AG, TriCore 1 32-bit Unified Processor Core User's Manual V1.3.8, vol. 1 Core Architecture V1.3 & V1.3.1 Architecture, (Entire Manual), Jan. 2008, Infineon Technnologies AG, Munich, Germany 81726.

* cited by examiner

GLOBAL REGISTER PROTECTION IN A MULTI-THREADED PROCESSOR

BACKGROUND

Multi-threaded processors typically comprise general-purpose local and global registers. The local registers are private to the particular hardware thread and can only be accessed by the hardware thread itself, whilst global registers are shared between different hardware threads. In an example, a multi-threaded processor may be a four-threaded processor and these four threads may all be able to access a set of global registers. These global registers may be used by different threads for different purposes and the allocation of global registers for these different purposes is typically performed by a compiler.

The embodiments described below are not limited to implementations which solve any or all of the disadvantages of known multi-threaded processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Global register protection in a multi-threaded processor is described. In an embodiment, global resources within a multi-threaded processor are protected by performing checks, before allowing a thread to write to a global resource, to determine whether the thread has write access to the particular global resource. The check involves accessing one or more local control registers or a global control field within the multi-threaded processor and in an example, a local register associated with each other thread in the multi-threaded processor is accessed and checked to see whether it contains an identifier for the particular global resource. Only if none of the accessed local resources contain such an identifier, is the instruction issued and the thread allowed to write to the global resource. Otherwise, the instruction is blocked and an exception may be raised to alert the program that issued the instruction that the write failed.

A first aspect provides a method for managing global resources within a multi-threaded processor, the method comprising: receiving an instruction from a thread to write to a global resource; checking, using hardware logic, one or more registers in the multi-threaded processor to determine whether the thread has write access to the global resource; and in response to determining that the thread has write access to the global resource, allowing the instruction to issue.

A second aspect provides a multi-threaded processor, comprising: a plurality of threads; at least one global resource; and hardware logic arranged to: receive an instruction from one of the plurality of threads to write to a global resource; check one or more registers in the multi-threaded processor to determine whether the thread has write access to the global resource; and in response to determining that the thread has write access to the global resource, allow the instruction to issue.

A third aspect provides a multi-threaded processor substantially as described with reference to any of FIGS. 1 and 4 of the drawings.

A fourth aspect provides a method of managing global resources within a multi-threaded processor, substantially as described with reference to any of FIGS. 2, 3 and 5 of the drawings.

The methods described herein may be performed by a computer configured with software in machine readable form stored on a tangible storage medium e.g. in the form of a computer program comprising computer program code for configuring a computer to perform the constituent portions of described methods. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
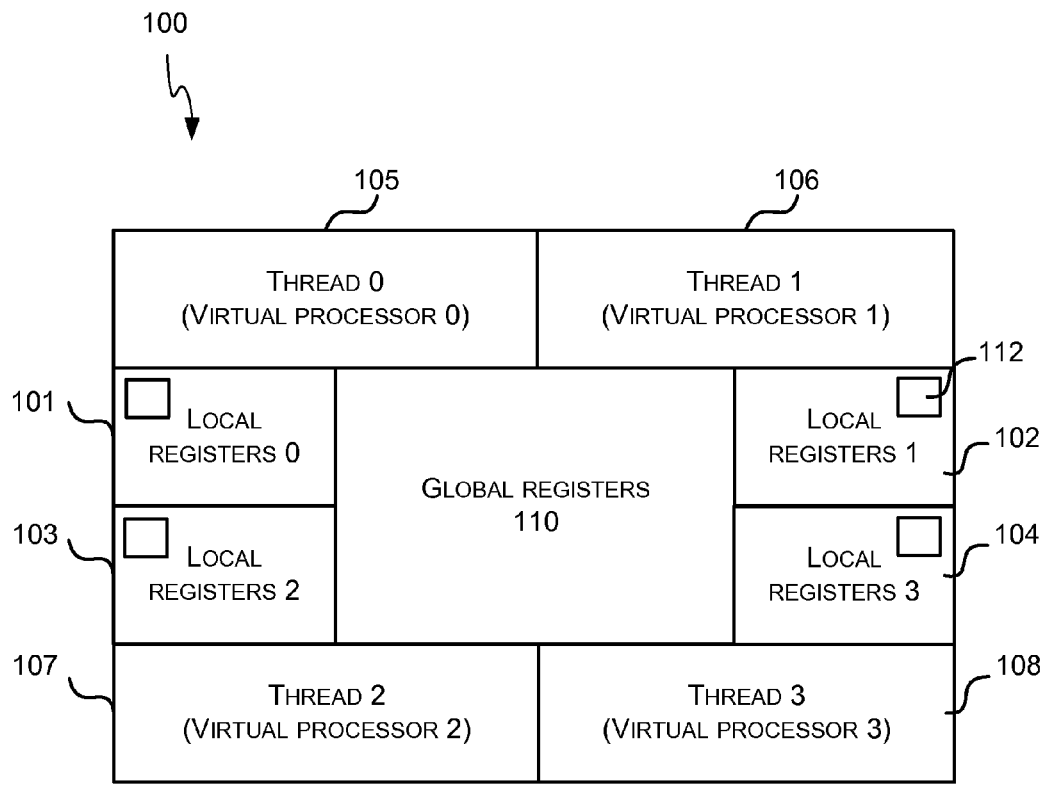
FIG. 1 shows a schematic diagram of a multi-threaded processor.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a schematic diagram of a multi-threaded processor 100 which comprises a number of groups of local registers 101-104 with each group of local registers (which may, for example, comprise 4 or 8 local registers) being associated with one of the threads 105-108. The multi-threaded processor 100 further comprises a number of global registers 110 (e.g. 8 or 16 global registers). The term 'global register' is used herein to refer to a register in a pool of registers which may be used by any of the threads and by any piece of code in the system in which the processor 100 is located. These global registers are an example of a global resource within the processor (where a 'global resource' is any resource which is shared between threads) and global registers may be used by a thread (e.g. as an additional local register) for a specific purpose, such as to store an alternative stack pointer or core state of the operating system.

As all threads can access the global resources, different threads can access and write to the same global register without any hardware restriction. Where a thread uses a particular global resource for a particular purpose, any modification or corruption of the data stored in the global resource by another thread may cause the processor or the system to function incorrectly. In an example, a global register may be used by the kernel (e.g. a Linux kernel) to store an alternative stack pointer (e.g. a separately allocated interrupt stack pointer) to be used by an interrupt handler. If this global register is modified or updated by another thread, then the interrupt handler will lose the intended access to its stack and not work correctly.

The following description describes methods and hardware for protecting global resources, such as global registers, so that they can only be written to by a particular thread which currently has control of the resource. In some examples, read protection may also be implemented and this is also described below. The act of protecting a resource, whether it is protection from write access or protection from both read and write access by other threads, may be described as a thread taking control of the particular resource. The methods described below enable a thread to take control of a global resource in such a way that the resource effectively becomes a local resource, because it cannot be modified, corrupted or updated by another thread. This provides flexibility for resource allocation (e.g. where one thread requires more resources than other threads for a period of time) and in addition, where the global resource is a global register used to store an alternative stack pointer, the value within the alternative stack pointer is enabled to persist throughout the program. The methods described below implement checks (e.g. before issuing write instructions to a global resource) in order that the global resources which are protected cannot be overwritten by another arbitrary thread.

Figure 2:
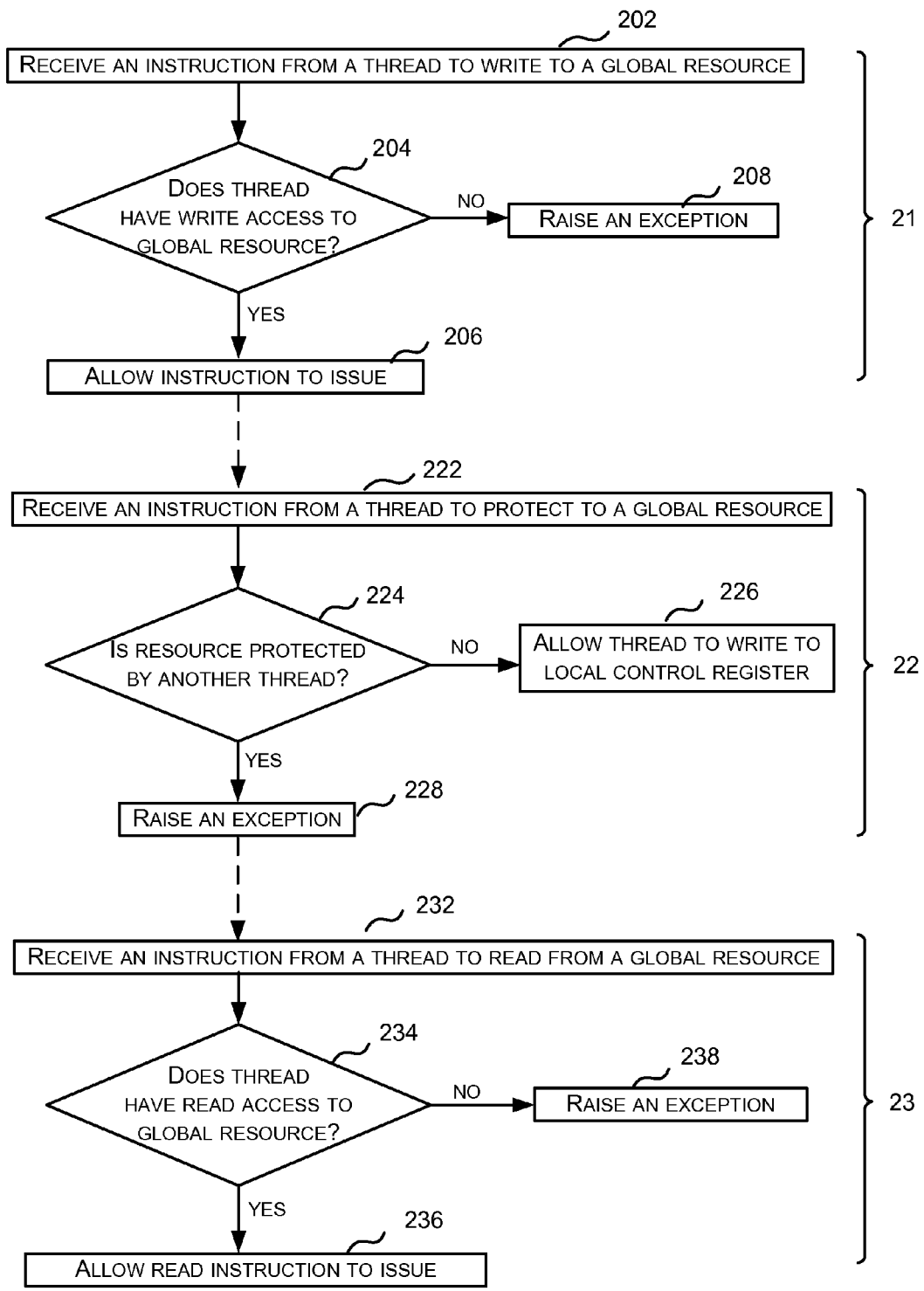
FIG. 2 shows three example flow diagrams of methods of operation of a multi-threaded processor.

FIG. 2 shows three example flow diagrams 21-23 of methods of operation of a multi-threaded processor. The first method 21, which is a method of preventing manipulation of global resources, may be used independently or in combination with either or both of the other methods 22-23 which show a method of protecting (or taking control of) a global resource (method 22) and a method of preventing read access to a global resource (method 23).

As shown in the first method 21 in FIG. 2, when an instruction is received from a thread which will write to a global resource (block 202), a check is performed (in block 204) to determine whether the particular thread has write access to the particular global resource identified in the instruction (i.e. whether the particular thread is permitted to write to the identified global resource). If the check (in block 204) identifies that the thread does have write access ('Yes' in block 204), then the instruction is allowed to issue (block 206) and if the thread does not have write access ('No' in block 204), then an exception is raised (block 208) to alert the program that the write has been unsuccessful.

The checking step (in block 204) may comprise accessing one or more local control registers to determine whether the particular thread has write access to the particular global resource identified (e.g. to a particular global register). In such an example, each thread has a local control register 112 which may be part of the thread's associated group of local registers 101-104, as shown in FIG. 1. The local control register 112 for a particular thread (e.g. Thread 0) is used to store details of any global resources that the thread has protected. As stated above, where a thread has protected a global resource, it may be described as having control over the particular global resource, where this control extends to preventing other threads from writing to the global resource. The local control register may identify global resources in any way and examples include, but are not limited to, a listing of identifiers (IDs) for those global resources which a thread has control over or use of a global resource mask (or global register mask). Where a mask is used, this mask identifies all those resources where control is claimed by the thread, instead of listing the individual IDs for each resource.

There are a number of different ways in which the multi-threaded processor, and in particular the global resources, may be configured and this affects the way that the local control registers 112 may be used to implement the checking step (in block 204) prior to issuing a write instruction. In a first example, the multi-threaded processor may be configured to have a default position that all threads have both read and write access to global resources, such that a thread can write to a global resource unless another thread in the multi-threaded processor has claimed control over that resource. In this situation, as shown in the first example flow diagram 31 in FIG. 3, the checking step (block 204) involves accessing the local control registers for each other thread in the multi-threaded processor (block 310) and determining, using the accessed local control registers, whether any other thread has claimed control of the particular global resource (block 312). Only if no other threads have claimed control of the particular global resource, i.e. this global resource is not identified in any of the accessed local control registers, ('No' in block 312) is the write instruction allowed to issue (block 206). As described above, where the global resource is already under the control of another thread (i.e. the global resource is identified in one of the accessed local control registers), the write instruction is not allowed to issue and an exception is raised (block 208).

In a second example, the multi-threaded processor may be configured such that default position is instead that the global resources are read-only for all threads, and a global resource can only be written to by a thread that has claimed control over the particular global resource. As can be seen from the second example flow diagram 32 in FIG. 3, this situation only requires one local control register to be accessed (block 320), i.e. the local control register of the thread which is attempting to perform the write, because unless the particular global resource identified in the write instruction is claimed in the thread's local control register (as determined in block 322), the global resource cannot be written to by the thread. Therefore, where the local control register does not identify the particular global resource ('No' in block 322), the instruction is not allowed to issue and an exception is raised (block 208). Alternatively, where the local control register does identify the particular global resource ('Yes' in block 322), the instruction is allowed to issue (block 206).

Figure 3:
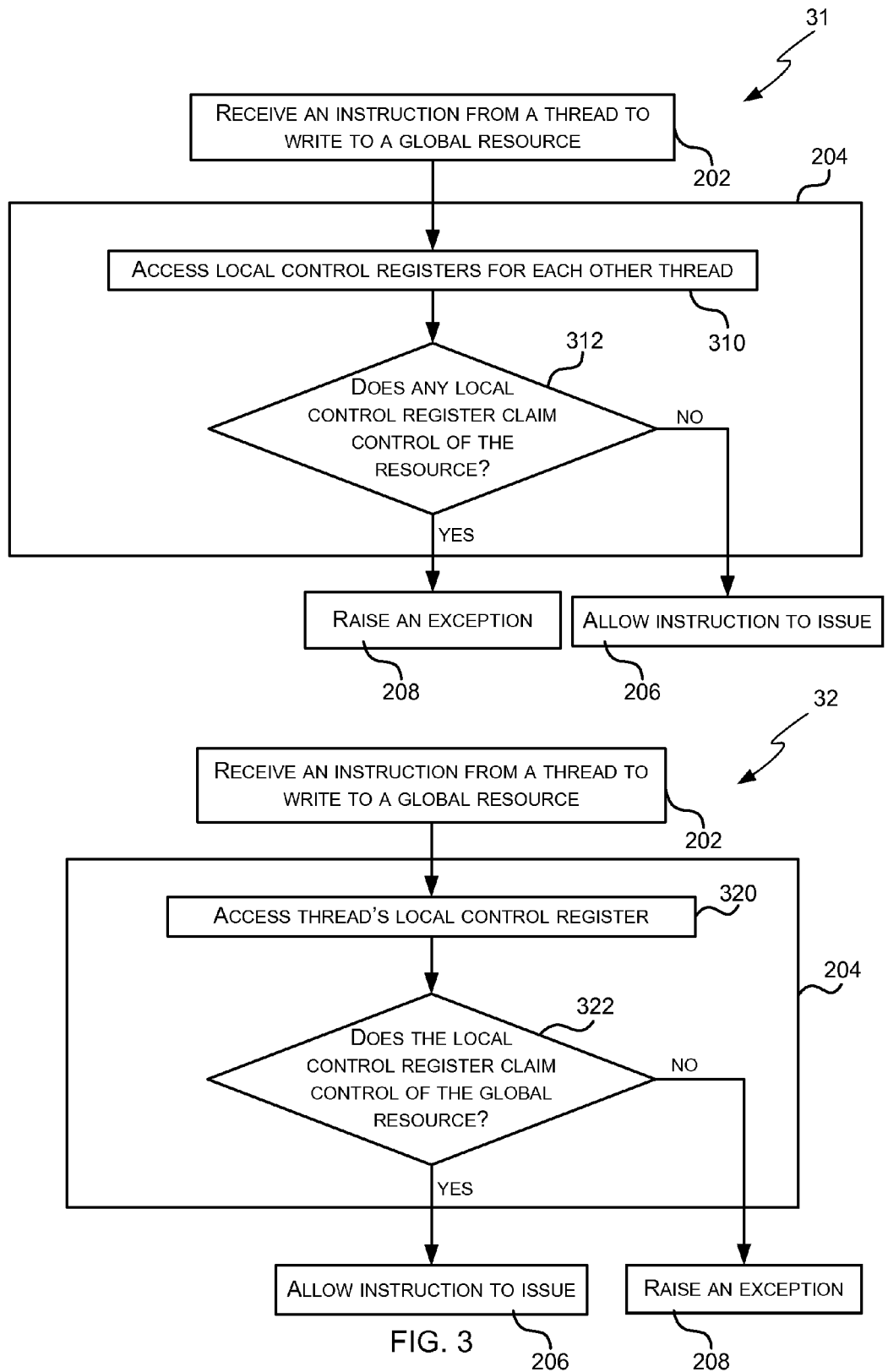
FIG. 3 shows two example flow diagrams of a method step from FIG. 2 in more detail.

In either of the examples shown in FIG. 3 and described above, the protection of the global resources is provided through use of the local control registers 112, where the local control register for a particular thread identifies the global resource(s) over which the thread is claiming control (i.e. such that the thread can write to the global resource and other threads cannot). In order that a thread can protect a global resource, a mechanism is provided by which a thread can write to its own local control register (e.g. as shown in the second flow diagram 22 in FIG. 2). As described above, the data written may comprise the ID of the global resource or may be in the form of an update to a global resource mask.

In some examples, each thread may be allowed to write to their own local control register without any checks being performed (i.e. independently of any activity of another thread in the multi-threaded processor). However, if no checks are performed, two (or more) threads may (in some implementations) claim control of the same global resource (e.g. the same global register) at the same time and this may result in neither thread being able to write to the global resource (if method 31 in FIG. 3 is used) or both threads being able to write to the global resource (if method 32 in FIG. 3 is used). Consequently, checks may be performed before a thread is able to write to its local control register, as shown in the second flow diagram 22 in FIG. 2. The method shown in the first flow diagram 21 in FIG. 2 may, however, be implemented independently of either of the other methods (in flow diagrams 22-23) shown in FIG. 2 and described below.

The second flow diagram 22 in FIG. 2 shows a method of protecting a global resource. When an instruction is received from a thread to protect a global resource (block 222), a check is performed (in block 224) to determine whether the global resource is currently protected by another thread. In a similar manner to blocks 310 and 312 in FIG. 3, these checks comprise accessing the local control registers for each other thread in the multi-threaded processor and then determining whether any of the accessed local control registers contain an entry claiming the particular global resource identified in the instruction received (in block 222). If no other thread has protected the global resource ('No' in block 224), the thread is allowed to write to the local control register and take control of the global resource (block 226). Otherwise if another thread has already taken control of the global resource (i.e. one of the local control registers which have been accessed contains an identifier for the particular global resource) an exception is raised (block 228) and the thread is prevented from claiming control of the particular global resource.

In some examples, a thread may be able to take control of any amount of global resources up to and including taking control of all the global resources (e.g. all of the global registers 110). However, in other examples, there may be a limit on the amount of global resources that any one thread can take control over and this limit may, for example, be implemented by restricting the size of the local control register. In such an example, a local control register may comprise one or more control fields, with each control field reserving one or more global registers. By limiting the number of control fields in a local control register, the number of global resources that a thread can protect is limited. Where a limit is applied, this limit may be the same for all of the threads in the multi-threaded processor or different threads may have different limits (e.g. if one thread has generally more capability, such as DSP and FPU, then it may be given a higher limit to allow it to have a larger maximum number of protected registers). In some examples, the limit may be implemented on a per-task basis such that a maximum number of global resources may be protected by a thread for each specific task or purpose. In an example, a dedicated control field may be provided for each specific task for which a global register can be claimed (e.g. one task may be an interrupt stack pointer and another task may be an extra local register) and the size of a control field (i.e. the number of global registers it reserves) may be dependent upon the particular task to which it relates such that different tasks may have different size control fields. For example, where the protected global resource is used for the purpose of storing a stack pointer, only one global register is required and so the local control field may comprise a single control field and the single control field may then protect a pair of global registers because within the processor concerned registers are organized in pairs. In other examples there may be a different number of control fields and/or a control field may protect a different number of global registers.

The allocation of particular global resources to particular threads may be static or may change over time (i.e. it may be dynamic). Where the amount of global resource that can be claimed is limited (e.g. through use of a restricted number of control fields), the methods may automatically result in threads rescinding control over global resources. For example, where a single control field is provided in a local control register and this control field identifies a single global register, a thread may protect a first global register and then switch from using the first global register to using a second global register for the same purpose. In protecting the second global register, the details of the first global register will be overwritten in the local control register and there will no longer be any protection enforced on this first global register. Another thread may then be able to write to this first global register (depending upon the default access status used in the multi-threaded processor) and another thread is able to claim control over the first global register.

In some examples, such as where there is no automatic rescinding of control over global resources, there may be an explicit mechanism to enable a thread to delete entries from its local control register. Such a mechanism does not require any checks before allowing the deletion of an entry in a local control register as the deletion of an entry does not adversely impact the operation of any of the other threads.

The above description relates to a thread taking control of a global resource so that the thread can write to the global resource and other threads cannot, and the global resource is then described as being protected (e.g. from corruption, overwriting, modification, etc). In an extension of the methods described, a thread may protect a global resource from being read as well as being written, as shown in the third example flow diagram 23 in FIG. 2. This may be useful, for example, where a thread wishes to store a secret, such as an RSA private key, in the global register. In such an implementation, an entry in a local control register identifying a particular global resource may prevent other threads from both reading from and writing to the resource, or alternatively, separate local control registers or separate control fields within a local control register may be provided for controlling read access and write access. As described above, the method shown in the first example flow diagram 21 in FIG. 2 may be used independently or in combination with either or both of the other methods shown in FIG. 2 (in example flow diagrams 22-23).

A thread may protect a global resource from being read using the method shown in the second flow diagram 22 in FIG. 2 (described above). Again, if checks are not performed (block 224 omitted) more than one thread may protect a global resource from being read, resulting in all threads being unable to read the particular global resource.

The third flow diagram 23 in FIG. 2 shows a method of implementing read protection of a global resource. On receipt of an instruction from a thread to read from a global resource (block 232), a check is performed which determines whether the thread has read access to the global resource identified in the read instruction (block 234) and this checking step may use mechanisms similar to those described above with reference to FIG. 3 and may depend on the way the global resources are configured within the multi-threaded processor. For example, where a thread has, by default, read access to all global resources, the check may comprise accessing the local control registers for all the other threads and checking that none of these local control registers record that another thread has protected read access to the particular global resource.

Alternatively, where by default, all the global registers are both read and write protected, the check (in block 234) comprises checking the local control register for the particular thread wishing to read the global resource to determine if the thread has claimed control of the global resource. If the check confirms that the thread does have read access ('Yes' in block 234), then the read instruction is allowed to issue (block 236) and otherwise an exception (e.g. a general protection exception) is raised (block 238).

Use of read protection in this way enables special instructions in the processor pipeline to be given access to a secret key in the allocated global register and the key can then be used by the special instructions perform secret functions.

Although the secret may alternatively be stored in a local register, instead of the global resource, use of the global resource (e.g. a global register) increases security and reduces complexity because the global registers are directly accessible by hardware and so it is not necessary to copy the secret from the global register to another location and then protect it in the new location in order that the secret can be used.

Where this read protection is used, the specific global register state may also be reset automatically whenever the read access protection is released/removed so the key is completely secure (unlike normal registers which are not routinely reset).

The example flow diagrams in FIGS. 2 and 3 which are described above (and also in FIG. 5, described below) raise an exception when an instruction cannot be issued (in blocks 208, 228 and 238). It will be appreciated that in variations on these methods, exceptions may not be raised, and in some examples instructions may be prevented from being issued. Irrespective of the implementation used, in all cases the instruction is prevented from reading/writing the real register value. Use of an exception allows the program that issued the instruction to know that the write/read was unsuccessful.

In an example application of the methods described above, the global resource is a global register and this global register is used to store an alternative stack pointer of an interrupt system. To protect the global register which is to be used as the alternative stack pointer from being overwritten, the index (or ID) number of the global register is written by the thread into its associated local control register (in this example, write protection is implemented and not read protection). If any other thread subsequently attempts to write to this global register (e.g. to store an alternative stack pointer in this global register) the checks performed prior to issuing the write instruction will fail and at this point an exception will occur, indicating that the particular global register is under the protection of another thread. The use of this alternative stack pointer is handled automatically in hardware (i.e. the value of the alternative stack pointer is copied into the actual stack pointer upon entry to the bottom level interrupt entry exit sequence).

In such an example application, an instruction may not know which register is used to store an alternative stack pointer, and so the local control register (and the relevant control field, where there are control fields for multiple specific purposes) associated with the thread executing the instruction may be accessed to identify which global register the alternative stack pointer is stored in. Where this is implemented, each thread may run the same code (i.e. the same list of instructions) and the local control register for a thread may be used to identify the particular location of the alternative stack pointer for a particular thread.

The methods described above may be implemented before run-time or at run-time. In an example, the allocation of which register numbers to give which threads may be predestined before run-time and the setup of the allocated thread registers for each thread may then be done during bootstrap/loading by a program that initially has full access to all threads control registers via external or internal paths. Once setup the program such a program can give up its right to manipulate/control the whole system state temporarily/permanently as appropriate so the system then performs its function with appropriate levels of protection or actual secrecy. In such an example, checking methods (e.g. the methods shown in flow diagram 21 and 23 in FIG. 2) are then implemented at run-time.

Figure 4:
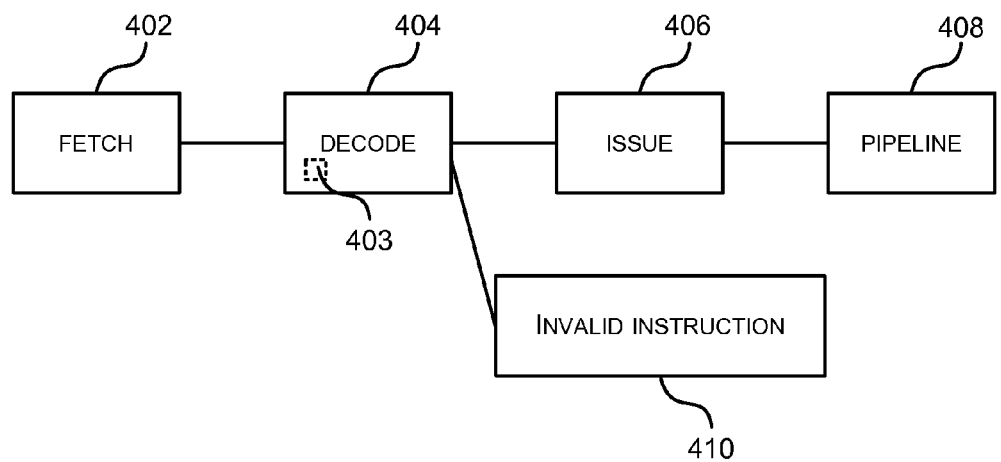
FIG. 4 shows another schematic diagram of a multi-threaded processor.

Any or all of the methods described above may be implemented in hardware 403 as part of the decode stage 404 of a multi-threaded processor. FIG. 4 shows a multi-threaded processor which comprises a fetch stage 402 arranged to fetch instructions from a program, a decode stage 404 arranged to interpret the instructions and perform register renaming, an issue stage 406 arranged to issue instructions and a pipeline 408 arranged to execute the issued instructions. As described above, the hardware (e.g. hardware logic) which performs the methods described above forms part of the decode stage 404 and is arranged to check one or more local control registers on receipt of an instruction to write to a global resource (and in some examples on receipt of an instruction to write to a global resource) and throw an exception 410, or otherwise prevent the instruction from issuing, when a thread is not permitted to read/write to a particular global resource (e.g. global register). The hardware may also be arranged to allow a thread to write to its associated local control register (as in method 22 in FIG. 2) and/or to check one or more local control registers on receipt of an instruction to read from a global resource (as in method 23 in FIG. 2).

Although FIG. 4 shows the hardware 403 as part of the decode stage 404, it will be appreciated that this hardware logic may alternatively be implemented as its own stage (e.g. between the decode stage 404 and issue stage 406) or included within another stage of the pipeline (e.g. as part of the issue stage 406).

Figure 5:
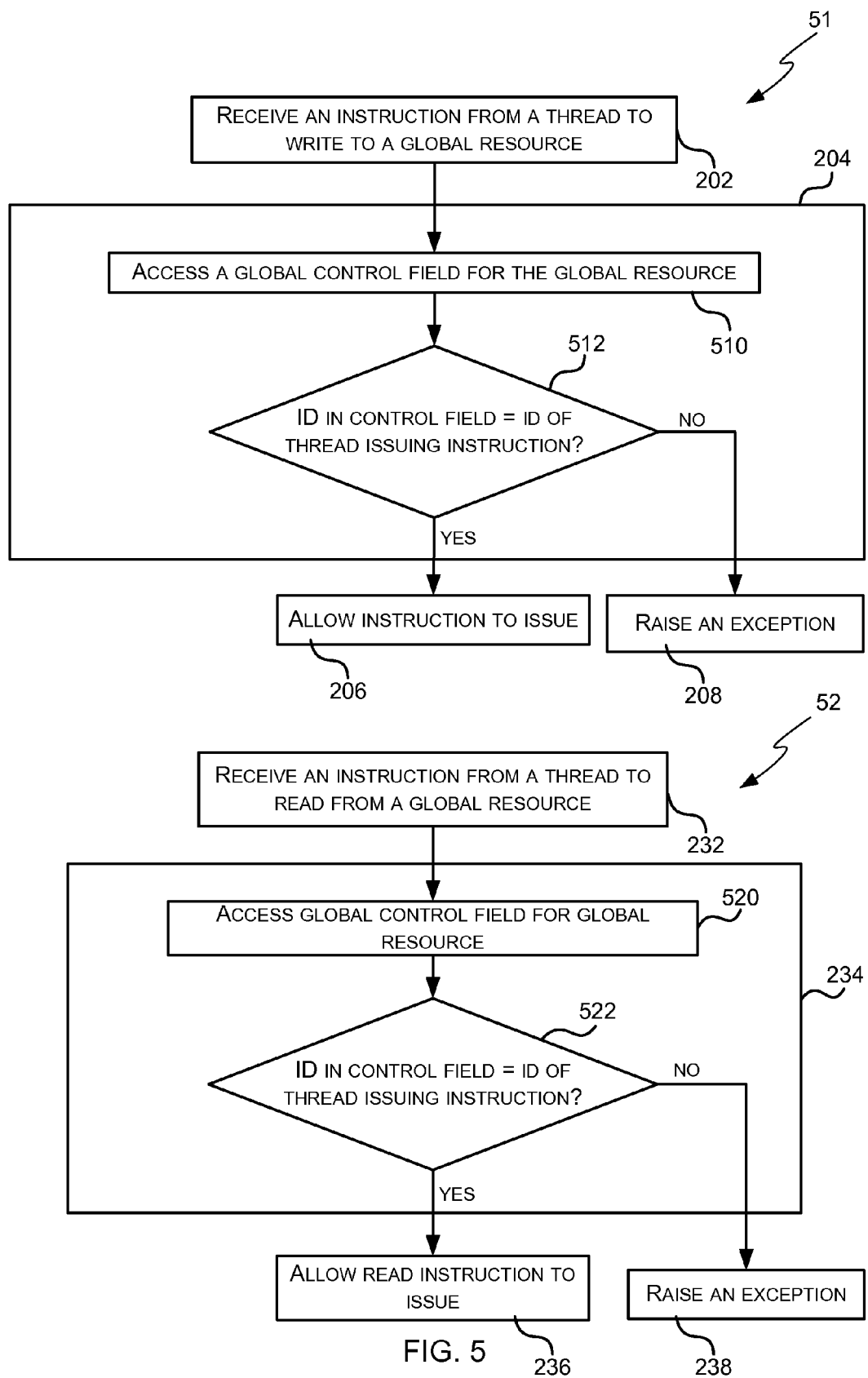
FIG. 5 shows two further examples of method steps from FIG. 2 in more detail.

Although the examples described above use local control registers when performing the access checks for a global resource (in blocks 204 and 234 in FIGS. 2 and 3), in other examples, the method may be implemented using a global control field per global resource. In such an example, a thread may gain control of a global resource by writing their thread ID into the appropriate control field and then when performing access checks, the control field may be checked to see if it contains the requesting thread's ID. FIG. 5 shows two example methods, which are variations of those shown in FIGS. 2 and 3. In the first example flow diagram 51, an instruction is received to write to a global resource (block 202) and the checking step (block 204) comprises checking the global control field for the global resource (block 510) to determine if it contains the ID of the thread that issued the write instruction (block 512). Only if the control field does contain the correct ID ('Yes' in block 512), is the instruction allowed to issue (block 206). The second example flow diagram 52, shows a corresponding method for checking read access. In a similar manner to the first flow diagram, the checking step (block 234) comprises checking the global control field for the global resource (block 520) to determine if it contains the ID of the thread that issued the read instruction (block 522). Only if the control field does contain the correct ID ('Yes' in block 522), is the instruction allowed to issue (block 236).

In the methods described above, a thread may gain control of a global resource, such as a global register. In some examples, a thread may reach a situation where it has finished using the resource and so may relinquish control of the particular global resource. Where global control fields are used to control access to the global resources, as shown in FIG. 5, a thread may clear the control field once it has finished using the global resource, to enable other threads to claim control. Similarly, where local control registers are used (e.g. as shown in FIGS. 2 and 3), a thread may clear entries in the local control registers in order to relinquish control of a particular global resource.

In the description above, methods and apparatus for protecting global resources are described. These methods may be applied to any resource which is shared between the threads in a multi-threaded processor (or between any two threads in a multi-threaded processor) and in an example the global resources may comprise global registers.

The methods described above may be applied to all the global resources within the multi-threaded processor or to a subset of the global resources. Where the methods are only applied to a subset of the global resources, the methods may, for example, be applied to a specific type of global resources (e.g. global registers) or a subset of a specific type (e.g. there may be some global registers that threads can protect and others that cannot be protected). In further examples, the methods may be applied to subsets of multiple types (e.g. a subset of global registers and a subset of another global resource).

The term 'processor' and 'computer' are used herein to refer to any device with processing capability such that it can execute instructions. Those skilled in the art will realize that such processing capabilities are incorporated into many different devices and therefore the term 'computer' includes set top boxes, media players, digital radios, PCs, servers, mobile telephones, personal digital assistants and many other devices.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process. Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may comprise additional operations or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

We claim:

1. A method for managing global resources within a multi-threaded processor, the multi-threaded processor comprising a plurality of threads and the method comprising:
   receiving an instruction from a thread to write to a global resource;
   checking, using hardware logic, one or more registers in the multi-threaded processor to determine whether the thread has write access to the global resource; and
   in response to determining that the thread has write access to the global resource, allowing the instruction to issue,
   wherein
   checking one or more registers in the multi-threaded processor to determine whether the thread has write access to the global resource comprises:
   checking one or more local control registers in the multi-threaded processor to determine whether the thread has write access to the global resource, wherein each local control register is associated with one of the plurality of threads.

2. A method according to claim 1, further comprising:
   in response to determining that the thread does not have write access to the global resource, preventing the instruction from issuing and raising an exception.

3. A method according to claim 1, wherein checking one or more local control registers in the multi-threaded processor to determine whether the thread has write access to the global resource comprises:

accessing a local control register associated with each other thread in the multi-threaded processor; and determining whether any accessed local control register identifies the global resource, wherein if none of the accessed local control registers identify the global resource, the thread has write access to the global resource.

4. A method according to claim 1, wherein checking one or more local control registers in the multi-threaded processor to determine whether the thread has write access to the global resource comprises:

accessing a local control register associated with the thread; and determining whether the accessed local control register identifies the global resource, wherein if the accessed local control register identifies the global resource, the thread has write access to the global resource.

5. A method according to claim 1, further comprising:

receiving an instruction from a thread to write data identifying a global resource to a local control register associated with the thread;

accessing a local control register associated with each other thread in the multi-threaded processor;

determining whether any accessed local control register comprises data identifying the global resource; and in response to determining that none of the accessed local control registers comprises data identifying the global resource, allowing the instruction to issue.

6. A method according to claim 5, further comprising:

in response to determining that one of the accessed local control registers comprises data identifying the global resource, preventing the instruction from issuing and raising an exception.

7. A method according to claim 1, wherein checking one or more registers in the multi-threaded processor to determine whether the thread has write access to the global resource comprises:

checking a global control field in a global register in the multi-threaded processor to determine whether the thread has write access to the global resource, the global control field being associated with the global resource.

8. A method according to claim 1, further comprising:

receiving an instruction from a thread to read from a global resource;

checking one or more registers in the multi-threaded processor to determine whether the thread has read access to the global resource; and in response to determining that the thread has read access to the global resource, allowing the instruction to issue.

9. A method according to claim 8, further comprising:

in response to determining that the thread does not have read access to the global resource, preventing the instruction from issuing and raising an exception.

10. A method for managing global resources within a multi-threaded processor, the multi-threaded processor comprising a plurality of threads and the method comprising:

receiving an instruction from a thread to write to a global resource;

checking, using hardware logic, one or more registers in the multi-threaded processor to determine whether the thread has write access to the global resource;

in response to determining that the thread has write access to the global resource, allowing the instruction to issue, receiving an instruction from a thread to read from a global resource;

checking one or more registers in the multi-threaded processor to determine whether the thread has read access to the global resource; and in response to determining that the thread has read access to the global resource, allowing the instruction to issue, wherein checking one or more registers in the multi-threaded processor to determine whether the thread has read access to the global resource comprises:

checking one or more local control registers in the multi-threaded processor to determine whether the thread has read access to the global resource, wherein each local control register is associated with one of the plurality of threads.

11. A method according to claim 10, wherein checking one or more local control registers in the multi-threaded processor to determine whether the thread has read access to the global resource comprises:

accessing a local control register associated with each other thread in the multi-threaded processor; and determining whether any accessed local control register identifies the global resource, wherein if none of the accessed local control registers identify the global resource, the thread has read access to the global resource.

12. A method according to claim 8, wherein checking one or more registers in the multi-threaded processor to determine whether the thread has read access to the global resource comprises:

checking a global control field associated with the global resource in the multi-threaded processor to determine whether the thread has read access to the global resource.

13. A method according to claim 1, wherein the instruction from a thread to write to a global resource comprises an instruction from a thread to write an alternative stack pointer to a global resource.

14. A method according to claim 1, wherein the global resource comprises a global register.

15. A multi-threaded processor, comprising:

a plurality of threads;

at least one global resource;

hardware logic arranged to:

receive an instruction from one of the plurality of threads to write to a global resource;

check one or more registers in the multi-threaded processor to determine whether the thread has write access to the global resource; and in response to determining that the thread has write access to the global resource, allow the instruction to issue; and a plurality of local control registers, each local control register associated with one of the plurality of threads and wherein the hardware logic is further arranged to determine whether the thread has write access to the global resource by checking one or more of the local control registers.

16. A multi-threaded processor according to claim 15, wherein the hardware logic is further arranged, in response to determining that the thread does not have write access to the global resource, to prevent the instruction from issuing and raise an exception.

17. A multi-threaded processor according to claim 15, wherein each local control register comprises one or more control fields and each control field is arranged to store data identifying one or more global resources in the multi-threaded processor.

18. A multi-threaded processor according to claim 17, wherein each control field is associated with a predefined task.

\* \* \* \* \*